(No Model.)  3 Sheets—Sheet 3.
W. H. BRYANT.
CHANNELING MACHINE.
No. 396,462.  Patented Jan. 22, 1889.
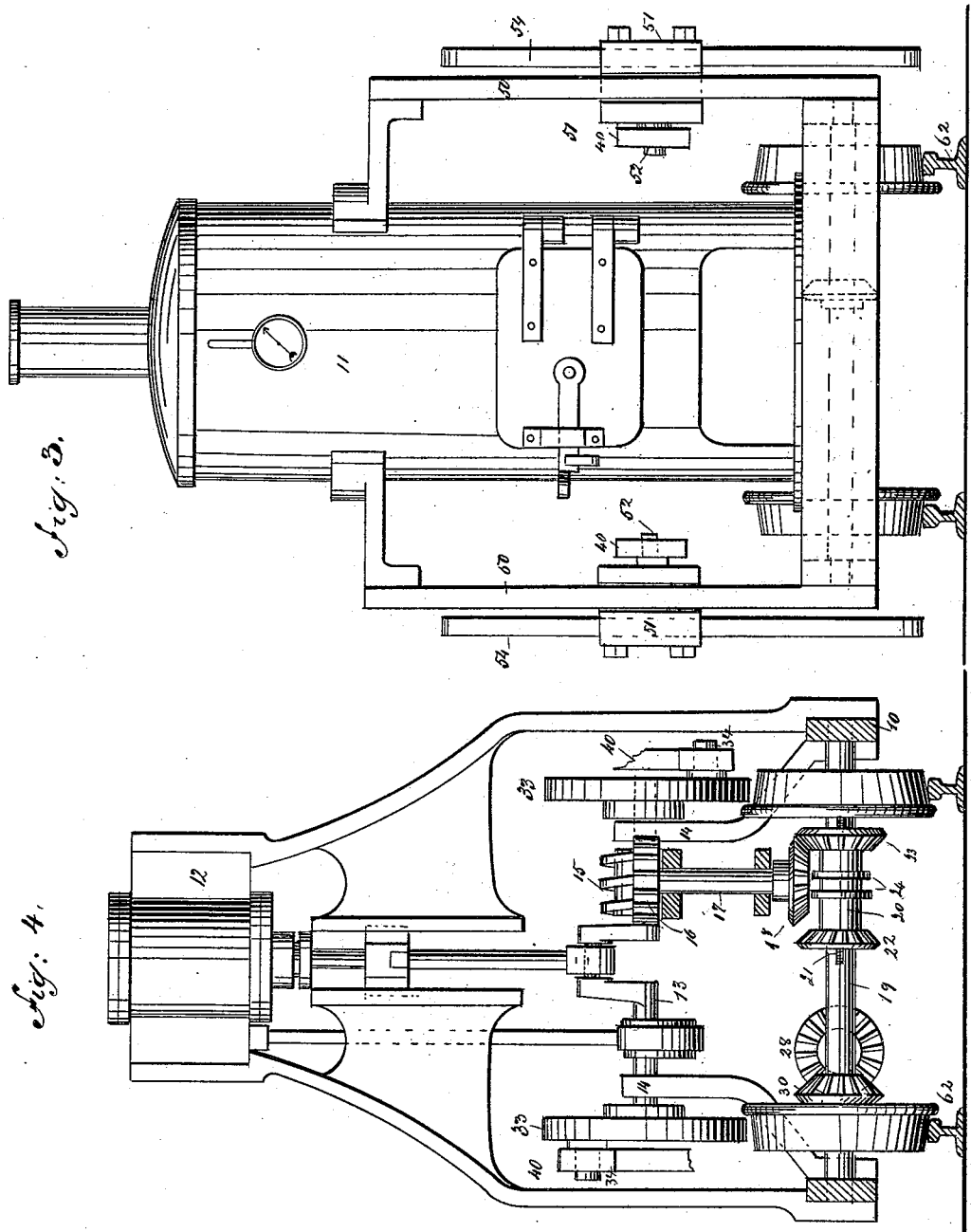
WITNESSES:
INVENTOR:
W. H. Bryant
BY Munn & Co.
ATTORNEYS.

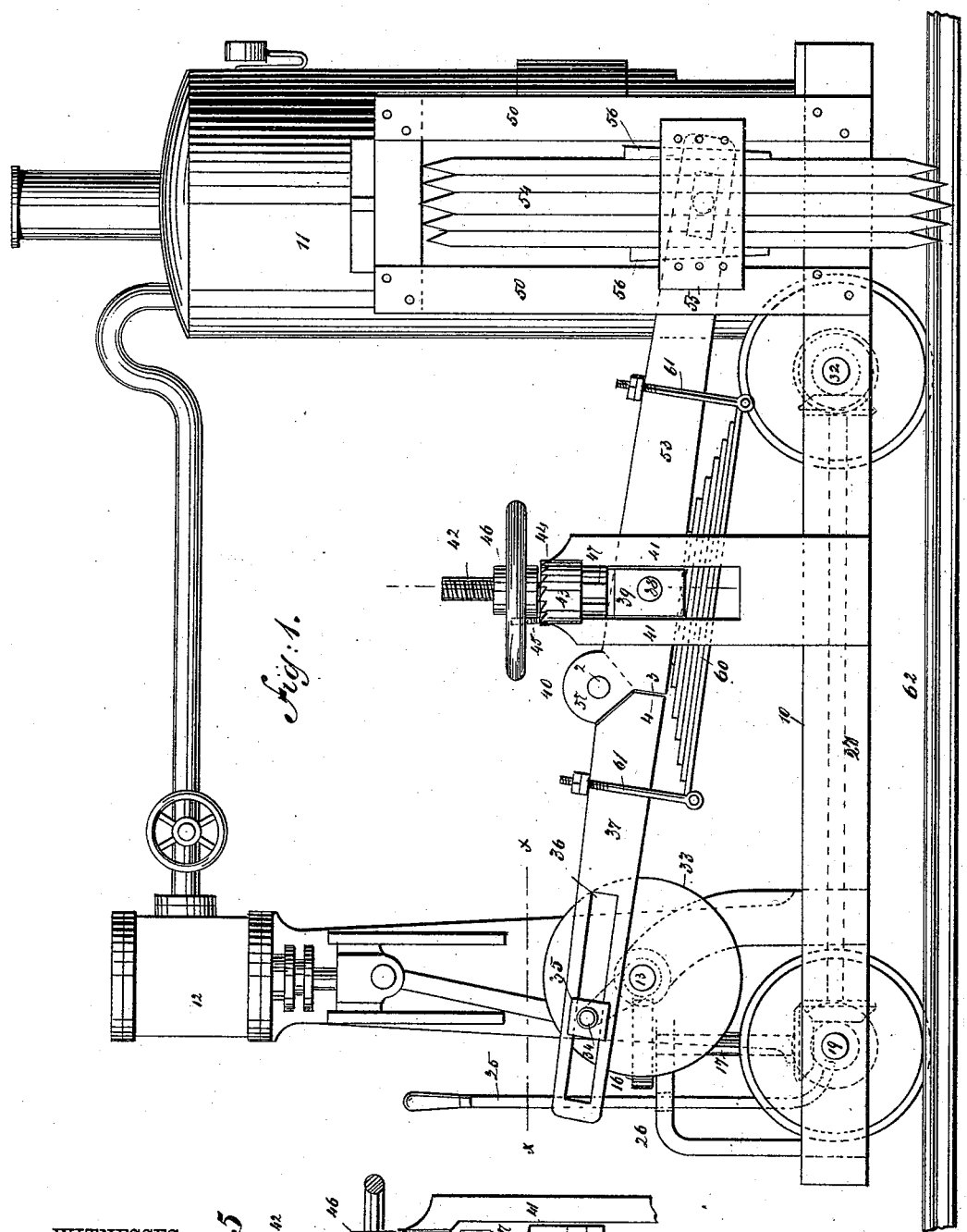

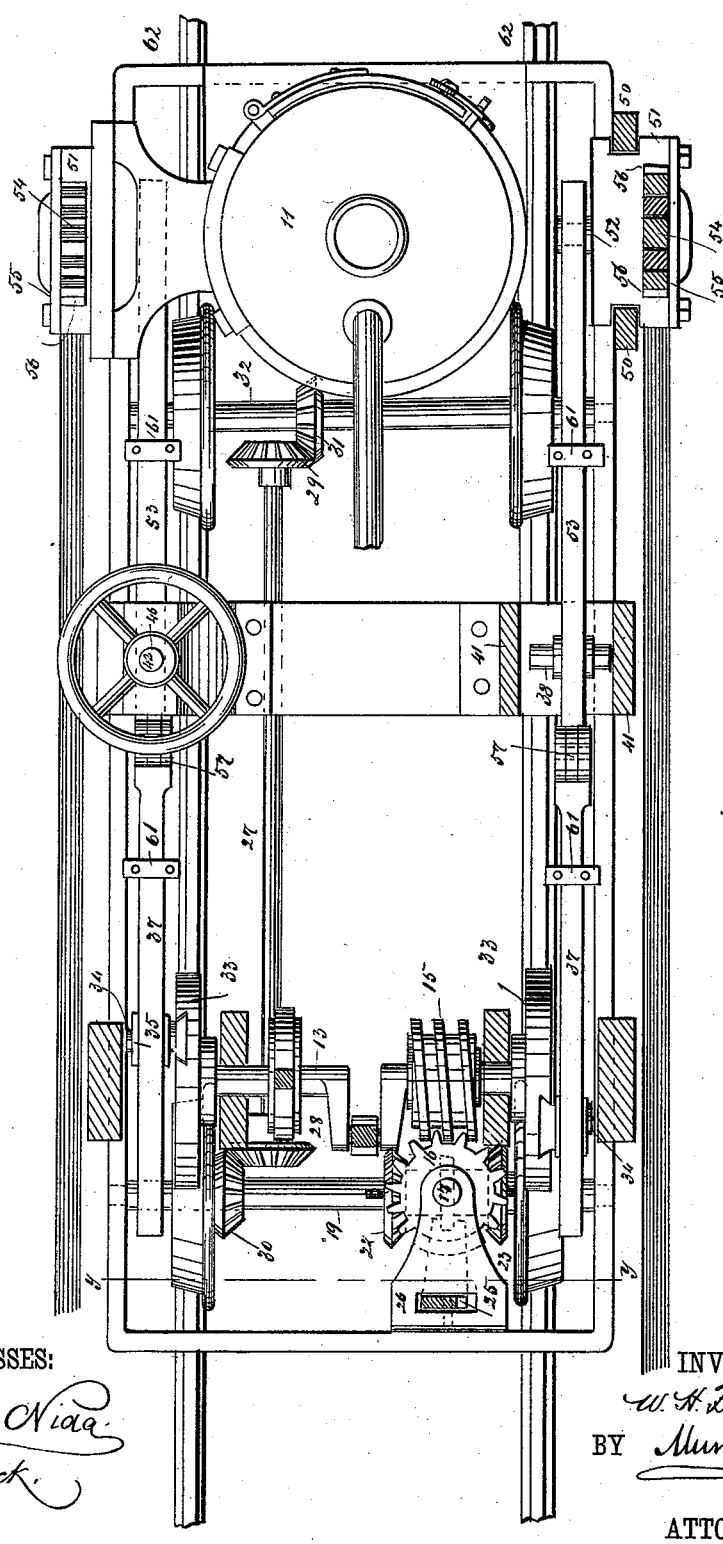

UNITED STATES PATENT OFFICE.

WILLIAM HENRY BRYANT, OF NORTH AMHERST, OHIO.

CHANNELING-MACHINE.

SPECIFICATION forming part of Letters Patent No. 396,462, dated January 22, 1889.

Application filed May 19, 1888. Serial No. 274,385. (No model.)

*To all whom it may concern:*

Be it known that I, WILLIAM HENRY BRYANT, of North Amherst, in the county of Lorain and State of Ohio, have invented a new and Improved Channeling-Machine, of which the following is a full, clear, and exact description.

This invention relates to a channeling-machine that is designed especially for quarry use, the main objects of the invention being to provide a means for throwing the drills forcibly but yieldingly against the stone, and to provide for the adjustment of the drills, so that they will operate properly irrespective of the depth of the channel.

To the ends above named the invention consists, essentially, of a jointed drill-carrying lever mounted upon an adjustable fulcrum, the two sections of said lever being normally held in the same plane by means of a spring, while the lever is connected to a crank-shaft, whereby a rocking motion is imparted thereto.

Reference is to be had to the accompanying drawings, forming a part of this specification, in which similar figures of reference indicate corresponding parts in all the views.

Figure 1 is a side view of my improved channeling-machine. Fig. 2 is a sectional plan view thereof, taken on the line $x$ $x$ of Fig. 1. Fig. 3 is a view of the forward end of the machine. Fig. 4 is a sectional view of the rear of the machine, the view being taken on line $y$ $y$ of Fig. 2; and Fig. 5 is a detail view of the adjustable lever-fulcrum, the lever and its spring being shown in section.

In the drawings above referred to, 10 represents a truck or vehicle-body, upon which there is mounted a boiler, 11, and an engine, 12, said engine being arranged to drive a crank-shaft, 13, that is mounted in bearings supported by standards 14, carried by the truck 10.

Upon the crank-shaft 13 there is fixed a worm-gear, 15, which engages a gear, 16, carried by a vertical shaft, 17, upon the lower end of which shaft there is a bevel-gear, 18, said gear being directly above the rear axle, 19. Upon this rear axle there is mounted a sleeve, 20, which rides upon a feather, 21, and to the sleeve there are rigidly connected two bevel-gears, 22 and 23. The sleeve 20 carries two collars, 24, and the space between these collars is entered by the lower end of a lever, 25, which is pivotally supported in a bracket, 26. (See Figs. 1 and 2.) By this arrangement it will be seen that by throwing the sleeve 20 so that the two gears 22 and 23 are out of engagement with the gear 18 the axle 19 will not be affected by the rotation of the shaft 17, but that if either of the gears 22 or 23 are thrown into engagement with the gear 18 the machine will be advanced or moved backward in accordance with the direction of the motion of the shaft 13.

In order that the forward axle and the wheels carried thereby may be moved positively at times when the axle 19 is revolved, I mount a longitudinal shaft, 27, in the position shown in the drawings, this shaft being provided with bevel-gears 28 and 29, the gear 28 being engaged by a gear, 30, carried by the axle 19, while the gear 29 engages a gear, 31, that is carried by the forward axle, 32. By so driving the two axles positively I increase the frictional contact between the wheels and the rail-treads, and consequently am able to advance the machine up much steeper grades than would be the case if I employed only two driving-wheels.

Upon the ends of the shaft 13 I mount a heavy balance-wheel, 33, each wheel being provided with a wrist or crank pin, 34, that engages a box, 35, arranged to slide in a longitudinal slot, 36, formed in the rear section, 37, of a jointed lever, 40, which lever is in turn mounted upon a fulcrum-pin, 38, that is carried by a box, 39, said box being connected to a threaded shank, 42, which passes upward through a top plate, 43, that is carried by slotted standards 41, the box entering the slots formed in the standards. The upper face of the plate 43 is cut to the form of a ratchet, 44, which ratchet is engaged by a pawl, 45, that is carried by a hand-wheel nut, 46, which nut engages the threaded shank 42. By this arrangement I provide for the vertical adjustment of the fulcrum-pin, the shank and the parts carried thereby being held against upward displacement by a jam-nut, 47, that is arranged below the plate 43. The peripheral face of the jam-nut 47 is formed with recesses, as shown, in order that it may be engaged by the claws of a spanner-wrench.

At either side and near the forward end of the truck-frame 10 I mount vertical standards 50, which serve as ways or guides for a block, 51, which block is provided with a stud or pin, 52, that enters a short longitudinal slot formed in the body of the forward section, 53, of the lever 40. The outer section of the block 51 is arranged to receive the drills 54, which drills are held to place by plates 55 and wedges 56.

As before stated, the lever 40 is a jointed lever, its joint 57 being located just to the rear of the fulcrum-pin 38. This joint 57 is formed by means of a pivot, pin, or pintle, 2, which passes through interlocking ears formed upon the lever-section, and below this pin the forward section, 53, is formed with a bearing face or shoulder, 3, against which there abuts a corresponding shoulder, 4, formed on the section 37, the arrangement being such that when the forward end of the lever is being moved upward the motion imparted to the forward lever-section will be positive, while when the forward end of the lever is moving downward the section 53 will be free to swing upon its pivotal connection with the section 37; but in order that the two sections may be normally held in line I mount a heavy spring, 60, just beneath the fulcrum-pin 38, the ends of this spring being held to the lever-sections by shackles 61.

In operation the machine above described is mounted upon a track or way made up of rails 62, and, the engine 12 having been started, a rotary motion will be imparted to the shaft 13, which motion will act to rock the levers 40 upon their fulcrum-pin, the arrangement being such that as the wrist or crank pins 34 are moving downward a positive upward movement will be imparted to the lever-sections 53; but when the crank or wrist pins 34 are moving upward the lever-sections 53 will be thrown downward, such downward movement, however, not being positive, inasmuch as any undue pressure upon the drill-points will act to throw the lever-sections 53 against the tension of their springs 60, so that by the arrangement hereinbefore described I provide not only for throwing the drills into yielding contact with the stone, but I also provide for the positive lifting of the drills from the channel formed thereby should they tend to jam between the walls of such channel.

When the machine is operated, the truck is alternately advanced and driven back over the rails 62, and as the channel deepens the hand-wheel nuts are turned so as to lower the lever-fulcrum, thus providing for the cutting of a channel equal in depth to the length of the extending ends of the drills.

Having thus described my invention, I claim as new and desire to secure by Letters Patent—

1. In a channeling-machine, the combination, with a pivoted drill-carrying lever formed of sections which are aligned and pivoted together at their abutting ends, of a leaf-spring arranged parallel thereto and spanning the joint between the sections, and connected thereto at its respective ends, substantially as and for the purpose specified.

2. In a channeling-machine, the combination, with the drill-carrying lever, made of two aligned abutting sections pivoted together, a fulcrum on which the longer section of said lever is pivoted, a leaf-spring arranged beneath the fulcrum and extending an equal distance each way therefrom and beneath the joint of the lever-sections in line with the same, and shackles which connect the ends of the spring with the respective lever-sections, as shown and described.

3. In a channeling-machine, the combination, with a lever made up of sections 37 and 53, formed, respectively, with bearing faces or shoulders 4 and 3, and connected by a pivot or pintle, 2, of an adjustable fulcrum upon which the lever is mounted, a crank-shaft, crank or wrist pins carried thereby, blocks arranged in longitudinal slots formed in the lever-sections 37, the crank-pins engaging said blocks, a drill-carrying box mounted in vertical guides and provided with a stud or pin which rides in a slot formed in the lever-section 53, and a spring, 60, arranged beneath the lever and connected to the lever-sections by shackles 61, substantially as described.

4. In a channeling-machine, the combination, with a crank-shaft provided with a wrist-pin, of a block with which said wrist-pin engages, a lever-section, 37, formed with a longitudinal slot, 36, in which the block rides, a lever-section, 53, pivotally connected to the section 37, the sections 37 and 53 being formed with abutting bearing-faces 4 and 3, a fulcrum-pin, 38, upon which the lever is mounted, a means, substantially as described, for adjusting said fulcrum-pin, a spring arranged beneath the lever and connected to the lever-sections by shackles 61, a drill-carrying block, ways in which said block is mounted, a stud or pin extending from the block and riding in a longitudinal slot formed in the lever-section 53, substantially as described.

5. In a channeling-machine, the combination, with a drill-carrying lever and a means for rocking the same, of a fulcrum-pin upon which the lever is mounted, a block, 39, arranged to support the fulcrum-pin, a threaded shank extending upward from said block, a plate supported above the lever and provided with ratchet-teeth, the threaded shank passing through said plate, a nut engaging the threaded shank above the plate, a pawl carried by said nut and arranged to engage the ratchet, and a jam-nut carried by the shaft below the ratchet-plate, substantially as described.

WILLIAM HENRY BRYANT.

Witnesses:
R. E. BRAMAN,
C. H. DOOLITTLE.